United States Patent
Jung et al.

(10) Patent No.: US 11,879,078 B2
(45) Date of Patent: Jan. 23, 2024

(54) CURABLE PRECURSOR OF A STRUCTURAL ADHESIVE COMPOSITION

(71) Applicant: 3M INNOVATIVE PROPERTIES COMPANY, St. Paul, MN (US)

(72) Inventors: Adrian T. Jung, Kaarst (DE); Boris Tasch, Düsseldorf (DE); Dirk Hasenberg, Raeren (BE); Olaf Ludewig, Düsseldorf (DE); Elisabeth Cura, Düsseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 548 days.

(21) Appl. No.: 17/281,104

(22) PCT Filed: Oct. 3, 2019

(86) PCT No.: PCT/IB2019/058427
§ 371 (c)(1),
(2) Date: Mar. 29, 2021

(87) PCT Pub. No.: WO2020/070687
PCT Pub. Date: Apr. 9, 2020

(65) Prior Publication Data
US 2021/0340406 A1 Nov. 4, 2021

(30) Foreign Application Priority Data
Oct. 3, 2018 (EP) .................................... 18198473

(51) Int. Cl.
| C09J 5/06 | (2006.01) |
| C08G 59/50 | (2006.01) |
| C08G 65/20 | (2006.01) |
| C08G 65/333 | (2006.01) |
| C08K 5/00 | (2006.01) |
| C09J 9/00 | (2006.01) |

(52) U.S. Cl.
CPC ............... *C09J 5/06* (2013.01); *C08G 59/50* (2013.01); *C08G 65/20* (2013.01); *C08G 65/33317* (2013.01); *C08K 5/0025* (2013.01); *C09J 9/00* (2013.01)

(58) Field of Classification Search
None
See application file for complete search history.

(56) References Cited

U.S. PATENT DOCUMENTS

| 3,453,242 | A | 7/1969 | Schmitt |
| 3,971,688 | A | 7/1976 | Abbott |
| 5,095,077 | A | 3/1992 | Gardeski |
| 5,194,307 | A | 3/1993 | Gardeski |
| 5,470,416 | A | 11/1995 | Herring, Jr. |
| 6,000,118 | A | 12/1999 | Biernat |
| 6,074,506 | A | 6/2000 | Herring, Jr. |
| 6,368,008 | B1 | 4/2002 | Biernat |
| 6,528,176 | B1 | 3/2003 | Asai |
| 2002/0182955 | A1 | 12/2002 | Weglewski |
| 2003/0153726 | A1 | 8/2003 | Eckhardt |
| 2006/0100301 | A1 | 5/2006 | You |
| 2012/0156487 | A1 | 6/2012 | Schoenfeld et al. |
| 2013/0030076 | A1* | 1/2013 | Weinmann ........... C08K 5/0025 522/31 |
| 2014/0113983 | A1* | 4/2014 | Czaplicki ............... C09J 181/04 521/95 |
| 2014/0370265 | A1* | 12/2014 | Lee ........................... C09J 5/06 522/111 |
| 2016/0362507 | A1* | 12/2016 | Marechal ............. C09D 163/00 |

FOREIGN PATENT DOCUMENTS

| CA | 2004131 | 5/1991 | |
| DE | 1544837 | 4/1970 | |
| EP | 0436745 | 7/1991 | |
| EP | 2700683 | 2/2014 | |
| EP | 3231413 A1 * | 10/2017 | ........... A61K 6/0038 |
| EP | 3659546 A1 * | 6/2020 | ......... A61C 13/0019 |
| JP | H0288684 | 3/1990 | |
| WO | WO 1997-31078 | 8/1997 | |
| WO | WO 2003-052016 | 6/2003 | |
| WO | WO 2007-014039 | 2/2007 | |
| WO | WO-2008019152 A1 * | 2/2008 | .............. C08J 3/243 |
| WO | WO 2009-071269 | 6/2009 | |
| WO | WO 2009-144299 | 12/2009 | |
| WO | WO 2011-063070 | 5/2011 | |
| WO | WO 2012-166257 | 12/2012 | |
| WO | 2015094710 | 6/2015 | |
| WO | 2016077131 | 5/2016 | |
| WO | WO 2017-197087 | 11/2017 | |
| WO | WO 2018-057335 | 3/2018 | |
| WO | 2020201944 | 10/2020 | |
| WO | WO 2020-201982 | 10/2020 | |

OTHER PUBLICATIONS

International Search Report for PCT International Application No. PCT/IB2019/058427, dated Dec. 16, 2019, 4 pages.

\* cited by examiner

*Primary Examiner* — Robert S Loewe
(74) *Attorney, Agent, or Firm* — Philip P. Soo

(57) ABSTRACT

The present disclosure relates to a curable precursor of a structural adhesive composition, comprising: a) a cationically self-polymerizable monomer; b) a polymerization initiator of the cationically self-polymerizable monomer which is initiated at a temperature T1; c) a curable monomer which is different from the cationically self-polymerizable monomer; and d) a curing initiator of the curable monomer which is initiated at a temperature T2 and which is different from the polymerization initiator of the cationically self-polymerizable monomer. According to another aspect, the present disclosure is directed to a partially cured precursor of a structural adhesive composition. According to still another aspect, the present disclosure relates to a method of bonding to parts. In yet another aspect, the disclosure relates to the use of a curable precursor or a partially cured precursor as described above, for industrial applications, in particular for body-in-white bonding applications for the automotive industry.

15 Claims, No Drawings

CURABLE PRECURSOR OF A STRUCTURAL ADHESIVE COMPOSITION

CROSS REFERENCE TO RELATED APPLICATIONS

This application is a national stage filing under 35 U.S.C. 371 of PCT/IB2019/058427, filed 3 Oct. 2019, which claims the benefit of European Patent Application No. 18198473.3, filed 3 Oct. 2018, the disclosures of which are incorporated by reference in their entirety herein.

TECHNICAL FIELD

The present disclosure relates generally to the field of adhesives, more specifically to the field of structural adhesive compositions and films for use in particular for bonding metal parts. More specifically, the present disclosure relates to a curable precursor of a structural adhesive composition and to a partially cured precursor composition. The present disclosure also relates to a method of bonding two parts and to a composite article. The present disclosure is further directed to the use of a curable precursor of a structural adhesive composition for construction and automotive applications, in particular for body-in-white bonding applications in the automotive industry.

BACKGROUND

Adhesives have been used for a variety of holding, sealing, protecting, marking and masking purposes. One type of adhesive which is particularly preferred for many applications is represented by structural adhesives. Structural adhesives are typically thermosetting resin compositions that may be used to replace or augment conventional joining techniques such as screws, bolts, nails, staples, rivets and metal fusion processes (e.g. welding, brazing and soldering). Structural adhesives are used in a variety of applications that include general-use industrial applications, as well as high-performance applications in the automotive and aerospace industries. To be suitable as structural adhesives, the adhesives shall exhibit high and durable mechanical strength as well as high impact resistance.

Structural adhesives may, in particular, be used for metal joints in vehicles. For example, an adhesive may be used to bond a metal panel, for example a roof panel to the support structure or chassis of the vehicle. Further, an adhesive may be used in joining two metal panels of a vehicle closure panel. Vehicle closure panels typically comprise an assembly of an outer and an inner metal panel whereby a hem structure is formed by folding an edge of an outer panel over an edge of the inner panel. Typically, an adhesive is provided there between to bond the panels together. Further, a sealant typically needs to be applied at the joint of the metal panels to provide for sufficient corrosion resistance. For example, U.S. Pat. No. 6,000,118 (Biernat et al.) discloses the use of a flowable sealant bead between the facing surfaces of the two panels, and a thin film of uncured paint-like resin between a flange on the outer panel and the exposed surface of the inner panel. The paint film is cured to a solid impervious condition by a baking operation performed on the completed door panel. U.S. Pat. No. 6,368,008 (Biernat et al.) discloses the use of an adhesive for securing two metal panels together. The edge of the joint is further sealed by a metal coating. WO 2009/071269 (Morral et al.) discloses an expandable epoxy paste adhesive as a sealant for a hem flange. A further hemmed structure is disclosed in U.S. Pat. No. 6,528,176 (Asai et al.). Further efforts have been undertaken to develop adhesive compositions whereby two metal panels, in particular an outer and an inner panel of a vehicle closure panel, could be joined with an adhesive without the need for a further material for sealing the joint. Thus, it became desirable to develop adhesive systems that provide adequate bonding while also sealing the joint and providing corrosion resistance. A partial solution has been described in e.g. WO 2007/014039 (Lamon), which discloses a thermally expandable and curable epoxy-based precursor of an expanded thermoset film toughened foamed film comprising a mixture of solid and liquid epoxy resins, and which is claimed to provide both favorable energy absorbing properties and gap filling properties upon curing. Other partial solutions have been described in EP-A1-2 700 683 (El-gimiabi et al.) and in WO 2017/197087 (Aizawa) which disclose structural adhesive films suitable for forming a hem flange structure. Structural adhesive films or tapes typically suffer from lack of elasticity and insufficient tackiness which makes them only partially suitable for hem flange bonding. Further partial solutions have been described in US-A1-2002/0182955 (Weglewski et al.) which discloses a so-called structural bonding tape. Structural bonding tapes are generally insufficient in terms of adhesive strength and corrosion resistance.

Without contesting the technical advantages associated with the solutions known in the art, there is still a need for a structural adhesive composition which would overcome the above-mentioned deficiencies.

SUMMARY

According to one aspect, the present disclosure relates to a curable precursor of a structural adhesive composition, comprising:
   a) a cationically self-polymerizable monomer;
   b) a polymerization initiator of the cationically self-polymerizable monomer which is initiated at a temperature T1;
   c) a curable monomer which is different from the cationically self-polymerizable monomer; and
   d) a curing initiator of the curable monomer which is initiated at a temperature T2 and which is different from the polymerization initiator of the cationically self-polymerizable monomer.

According to another aspect, the present disclosure is directed to a partially cured precursor of a structural adhesive composition, comprising:
   a) a polymeric material comprising the self-polymerization reaction product of a polymerizable material comprising a cationically self-polymerizable monomer;
   b) optionally, some residual polymerization initiator of the cationically self-polymerizable monomer which is initiated at a temperature T1;
   c) a curable monomer which is different from the cationically self-polymerizable monomer; and
   d) a curing initiator of the curable monomer which is initiated at a temperature T2 and which is different from the polymerization initiator of the cationically self-polymerizable monomer; and
wherein the curable monomers are substantially uncured.

In still another aspect of the present disclosure, it is provided a method of bonding two parts, which comprises the steps of:
   a) applying a curable precursor or a partially cured precursor as described above to a surface of at least one of the two parts;

b) joining the two parts so that the curable precursor or the partially cured precursor (hybrid) structural adhesive composition is positioned between the two parts; and c) optionally, partially curing the curable precursor according of step a) by initiating the polymerization initiator of the cationically self-polymerizable monomer, thereby forming a partially cured precursor comprising a polymeric material resulting from the self-polymerization reaction product of the cationically self-polymerizable monomer; and/or d) substantially fully curing the partially cured precursor of step a) or c) by initiating the curing initiator of the cationically curable monomer, thereby obtaining a substantially fully cured (hybrid) structural adhesive composition and bonding the two parts.

According to yet another aspect, the present disclosure relates to the use of a curable precursor or a partially cured precursor as described above, for industrial applications, in particular for body-in-white bonding applications for the automotive industry.

DETAILED DESCRIPTION

According to a first aspect, the present disclosure relates to a curable precursor of a structural adhesive composition, comprising:

a) a cationically self-polymerizable monomer;

b) a polymerization initiator of the cationically self-polymerizable monomer which is initiated at a temperature T1;

c) a curable monomer which is different from the cationically self-polymerizable monomer; and d) a curing initiator of the curable monomer which is initiated at a temperature T2 and which is different from the polymerization initiator of the cationically self-polymerizable monomer.

In the context of the present disclosure, it has been surprisingly found that a curable precursor as described above is particularly suitable for manufacturing structural adhesive compositions provided with excellent characteristics and performance as to elasticity, tackiness, cold-flow, flexibility, handling properties and surface wetting in their uncured (or pre-cured) state, as well as to adhesive strength, ageing stability and corrosion resistance in their fully cured state. The curable precursor of a structural adhesive composition as described above have been surprisingly found to combine most of the advantageous characteristics of both the structural adhesive films and the structural bonding tapes known in the art, without exhibiting their known deficiencies.

It has further been discovered that, in some executions, the curable precursor as described above is suitable for manufacturing structural adhesive compositions provided with excellent characteristics and performance as to adhesion to oily contaminated substrates, such as stainless steel and aluminum.

Without wishing to be bound by theory, it is believed that these excellent characteristics are due in particular to the presence of a specific dual curing system in the curable precursor, wherein the curing system comprises: a) a polymerization initiator of a cationically self-polymerizable monomer which is initiated at a temperature T1, and b) a curing initiator of a curable monomer which is initiated at a temperature T2 and which is different from the polymerization initiator of the cationically self-polymerizable monomer.

Still without wishing to be bound by theory, it is believed that this dual/hybrid curing system involving two independent reactive systems, which have a different chemical nature and which co-exist in the curable precursor without interfering with each other, has the ability to form—upon complete curing—an interpenetrating network involving a polymeric material comprising the self-polymerization reaction product of a polymerizable material comprising the cationically self-polymerizable monomer and a polymeric product resulting from the curing of the curable monomer.

More specifically, the above described hybrid curing system is particularly suitable to perform an overall curing mechanism involving a two-stage reaction whereby two polymer networks are formed sequentially.

In a first stage reaction (stage-B), the cationically self-polymerizable monomers polymerize upon initiation by the polymerization initiator of the cationically self-polymerizable monomer at a temperature T1, thereby forming a polymeric material comprising the self-polymerization reaction product of a polymerizable material comprising the cationically self-polymerizable monomers. Typically, the temperature T1 at which the polymerization initiator of the cationically self-polymerizable monomer is initiated is insufficient to cause initiation of the curing initiator of the curable monomer. As a consequence, the first stage reaction typically results in a partially cured precursor, wherein the curable monomers are substantially uncured and are in particular embedded into the polymeric material comprising the self-polymerization reaction product of the polymerizable material comprising the cationically self-polymerizable monomers.

The first stage reaction which typically leads to a phase change of the initial curable precursor due in particular to the polymeric material comprising the self-polymerization reaction product of the cationically self-polymerizable monomers providing structural integrity to the initial curable precursor, is typically referred to as a film-forming reaction. Advantageously, the first stage reaction does typically not require any substantial energy input.

The partially cured precursor typically takes the form of a film-like self-supporting composition having a dimensional stability, which makes it possible for it to be pre-applied on a selected substrate, in particular a liner, until further processing. The partially cured precursor is typically provided with excellent characteristics and performance as to elasticity, tackiness, cold-flow and surface wetting. Advantageously, the partially cured precursor may be appropriately shaped to fulfil the requirements of any specific applications.

The second stage reaction (stage-A) occurs after the first stage reaction and typically involves curing the curable monomers upon initiation (typically thermal initiation) by the appropriate curing initiators at a temperature T2. This reaction step typically results in forming a polymeric product resulting from the curing of the curable monomer, in particular from the (co)polymerization of the curable monomers and the curing initiators (or curatives) of the curable monomers.

The curable precursor of the present disclosure typically relies on the above-described dual/hybrid curing system involving two independent reactive systems activated at distinct temperatures (T1 and T2) to ensure performing the above-described two-stage reaction in a sequential manner. Advantageously, the curable precursor of the present disclosure may be partially cured (or pre-cured) and pre-applied on a selected substrate before being finally cured in-place to produce a structural adhesive provided with excellent characteristics directly on the desired substrate or article.

As such, the curable precursor of the present disclosure is outstandingly suitable for bonding metal parts, in particular for hem flange bonding of metal parts in the automotive industry. Advantageously still, the curable precursor is suitable for automated handling and application, in particular by fast robotic equipment.

In the context of the present disclosure, the expression "cationically self-polymerizable monomer" is meant to refer to a monomer able to form a polymeric product (homopolymer) resulting from the polymerization of the monomer almost exclusively with itself and involving the formation of a cationic intermediate moiety, thereby forming a homopolymer. The term "homopolymer" is herein meant to designate polymer(s) resulting from the polymerization of a single type of monomers.

In the context of the present disclosure still, the expression "curable monomer" is mean to refer to a monomer able to form a polymeric product (heteropolymer) resulting from the (co)polymerization of the curable monomers and the curing initiators (or curatives) of the curable monomers. The term "heteropolymer" is herewith meant to designate a polymer resulting from the (co)polymerization of more than one type of monomers.

In the context of the present disclosure, the expression "the curable monomers are substantially uncured" is meant to designate that less than 10 wt %, less than 5 wt %, less than 2 wt %, or even less than 1 wt % of the initial curable monomers are unreacted.

The terms "glass transition temperature" and "Tg" are used interchangeably and refer to the glass transition temperature of a (co)polymeric material or a mixture of monomers and polymers. Unless otherwise indicated, glass transition temperature values are determined by Differential Scanning calorimetry (DSC).

According to one typical aspect of the curable precursor of the disclosure, the temperature T2 for use herein is greater than temperature T1. In a typical aspect, the temperature T1 at which the polymerization initiator of the cationically self-polymerizable monomer is initiated is insufficient to cause initiation of the curing initiator of the curable monomer which therefore remain substantially unreacted.

According to another typical aspect of the curable precursor of the disclosure, the cationically self-polymerizable monomer and the curable monomer for use herein are unable to chemically react with each other, in particular by covalent bonding, even when subjected to their respective polymerization or curing initiation. In an exemplary aspect, the cationically self-polymerizable monomer and the curable monomer are unable to chemically react with each other, when subjected to polymerization or curing initiation at a temperature of 23° C.

In one exemplary aspect of the present disclosure, the temperature T1 for use herein is no greater than 90° C., no greater than 80° C., no greater than 60° C., no greater than 50° C., no greater than 40° C., no greater than 30° C., no greater than 25° C., no greater than 20° C., or even no greater than 15° C. In some exemplary aspects of the disclosure, the polymerization initiator of the cationically self-polymerizable monomer is already initiated at room temperature (about 23° C.).

In another exemplary aspect of the present disclosure, the temperature T1 is in a range from −10° C. to 85° C., from 0° C. to 80° C., from 5° C. to 60° C., from 5° C. to 50° C., from 10 to 40° C., or even from 15 to 35° C.

In still another exemplary aspect of the present disclosure, the temperature T2 for use herein is greater than 90° C., greater than 100° C., greater than 120° C., greater than 140° C., greater than 150° C., greater than 160° C., greater than 180° C., or even greater than 200° C.

According to another typical aspect of the curable precursor, the temperature T2 is in a range from 95° C. to 250° C., from 100° C. to 220° C., from 120° C. to 200° C., from 140° C. to 200° C., from 140° C. to 180° C., or even from 160° C. to 180° C.

In some exemplary aspects of the disclosure, the curing initiator of the curable monomer for use herein which is initiated at a temperature T2 may be qualified as a thermally-initiated curing initiator or thermal initiator which is activated at substantially high temperatures.

Cationically self-polymerizable monomers for use herein are not particularly limited. Suitable cationically self-polymerizable monomers for use herein may be easily identified by those skilled in the art in the light of the present disclosure.

According to one advantageous aspect of the curable precursor of the disclosure, the cationically self-polymerizable monomer for use herein is able to polymerize by cationic ring-opening polymerization. Accordingly, and in a beneficial aspect, the cationically self-polymerizable monomer for use in the present disclosure comprises at least two heterocyclic groups, in particular cyclic amine groups.

According to another advantageous aspect of the disclosure, the cationically self-polymerizable monomer for use herein is further crosslinkable, in particular able to participate in crosslinking reactions of the polymer product resulting from the polymerization of the cationically self-polymerizable monomers.

In a beneficial aspect of the disclosure, the cationically self-polymerizable monomer for use herein is an oligomer having, in particular a number average molecular weight no greater than 20.000 g/mol, no greater than 15.000 g/mol, no greater than 12.000 g/mol, no greater than 10.000 g/mol, or even no greater than 8.000 g/mol. Unless otherwise indicated, the number average molecular weight is determined by GPC using appropriate techniques well known to those skilled in the art.

According to a beneficial aspect of the disclosure, the cationically self-polymerizable monomer for use herein is a polyfunctional compound comprising at least one cyclic amine, preferably two cyclic amines. In an exemplary aspect, the cyclic amine which may be comprised in the cationically self-polymerizable monomer for use herein is selected from the group consisting of aziridines, azetidines, pyrrolidines, piperidines, and any combinations or mixtures thereof.

In one advantageous aspect, the cationically self-polymerizable monomer for use herein is a polyfunctional compound comprising at least two aziridine functional groups. More advantageously, the cationically self-polymerizable monomer for use herein is a polyfunctional aziridine, in particular a bis-aziridino compound.

In a more advantageous aspect of the disclosure, the cationically self-polymerizable monomer is an aziridino-functional oligomer. Advantageously, the cationically self-polymerizable monomer is an aziridino-functional polar oligomer.

In an exemplary aspect, the aziridino-functional oligomer for use herein has a number average molecular weight no greater than 20.000 g/mol, no greater than 15.000 g/mol, no greater than 12.000 g/mol, no greater than 10.000 g/mol, or even no greater than 8.000 g/mol.

According to another advantageous aspect of the disclosure, the cationically self-polymerizable monomer for use herein is an aziridino-functional compound based on an oligomeric backbone, in particular a linear oligomer backbone, more in particular a linear polar oligomer backbone.

In an exemplary aspect, the oligomeric backbone for use in the aziridino-functional compound comprises moieties selected from the group consisting of polyether, polyester, polyurethane, polythioether, polysulfide, silicone, polyalkylene, polystyrene, and any combinations of mixtures thereof. In a more advantageous aspect, the oligomeric backbone for use in the aziridino-functional compound comprises moieties selected from the group consisting of polyether, polyester, polythioether, and any combinations of mixtures thereof.

According to an advantageous aspect, the cationically self-polymerizable monomer is an aziridino-functional (linear) polyether oligomer, in particular an N-alkyl aziridino-functional (linear) polyether oligomer.

Suitable polyether oligomers may be produced in a manner known to those skilled in the art by the reaction of the starting compound having a reactive hydrogen atom with alkylene oxides, for example ethylene oxide, propylene oxide, butylene oxide, styrene oxide, tetrahydrofuran or epichlorohydrine or mixtures of two or more thereof. Especially suitable polyether oligomers for use herein are obtainable by polyaddition of ethylene oxide, 1,2-propylene oxide, 1,2-butylene oxide or tetrahydrofuran or of mixtures of two or more of the mentioned compounds with the aid of a suitable starting compound and a suitable catalyst.

In a particularly beneficial aspect, suitable polyether oligomers for use herein are polyetherdiols obtainable by cationic copolymerization of ethylene oxide and tetrahydrofuran under catalytic action of boron trifluoride etherate. Suitable cationically self-polymerizable monomers for use herein and possible production methods thereof are described e.g. in U.S. Pat. No. 3,453,242 (Schmitt et al.).

According to one preferred execution of the present disclosure, the cationically self-polymerizable monomer for use herein has the following formula:

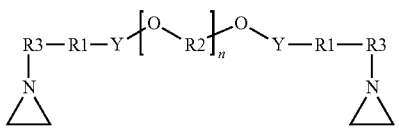

wherein:

$R^1$ is a covalent bond or an alkylene group;

each $R^2$ is independently selected from the group consisting of alkylene groups;

$R^3$ is a straight chain or branched alkylene groups;

Y is a divalent linking group;

and n is an integer selected such that the calculated number average molecular weight of the polyether oligomer is in particular greater than 2000 g/mol.

According to another preferred execution of the present disclosure, the cationically self-polymerizable monomer for use herein has the following formula:

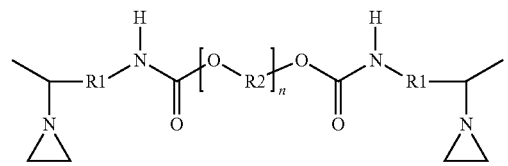

wherein:
$R^1$ is an alkylene group;
each $R^2$ is independently selected from the group consisting of alkylene groups having
2 to 6 carbon atoms; and
n is an integer selected such that the calculated number average molecular weight of the polyether oligomer is in particular between 2000 and 10.000 g/mol.

According to still another preferred execution of the present disclosure, the cationically self-polymerizable monomer for use herein has the following formula:

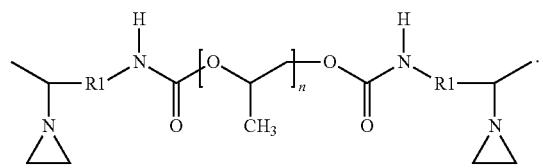

In an advantageous aspect, radical $R^1$ is an alkylene group having two carbon atoms. In another advantageous aspect, radical $R^2$ is independently selected from the group consisting of linear alkylene groups having 2 to 6 carbon atoms.

According to still another advantageous aspect of the present disclosure, the cationically self-polymerizable monomer for use herein has the following formula:

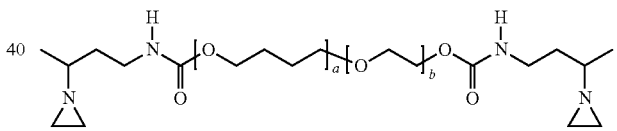

wherein a and b are integers greater than or equal to 1, and the sum of a and b is equal to n.

According to an exemplary aspect of the disclosure, n is selected such that the calculated number average molecular weight of the cationically self-polymerizable monomer is no greater than 10.000 grams/mole.

Curable monomers for use herein are not particularly limited, as long as they are different from the cationically self-polymerizable monomers. Any curable monomers commonly known in the art of structural adhesives may be used in the context of the present disclosure. Suitable curable monomers for use herein may be easily identified by those skilled in the art in the light of the present disclosure.

According to one particular aspect of the disclosure, the curable monomer for use herein is a cationically curable monomer, which is in particular curable by cationic ring-opening curing.

According to an advantageous aspect of the present disclosure, the curable monomer for use herein comprises at least one functional group selected from the group consisting of epoxy groups, in particular glycidyl groups.

According to another advantageous aspect, the curable monomer for use herein is an epoxy resin. Exemplary epoxy resins for use herein may be advantageously selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

Epoxy resins are well known to those skilled in the art of structural adhesive compositions. Suitable epoxy resins for use herein and their methods of manufacturing are amply described e.g. in EP-A1-2 700 683 (Elgimiabi et al.) and in WO 2017/197087 (Aizawa).

In a particularly advantageous aspect of the disclosure, the curable monomer for use herein is an epoxy resin selected from the group consisting of novolac epoxy resins, bisphenol epoxy resins, in particular those derived from the reaction of bisphenol-A with epichlorhydrin (DGEBA resins), and any mixtures thereof.

Polymerization initiators of the cationically self-polymerizable monomer for use herein are not particularly limited. Any polymerization initiators of cationically self-polymerizable monomers commonly known in the art of structural adhesives may be used in the context of the present disclosure. Suitable polymerization initiators of the cationically self-polymerizable monomer for use herein may be easily identified by those skilled in the art in the light of the present disclosure.

Exemplary polymerization initiators of the cationically self-polymerizable monomer for use herein are amply described in O. C. DERMER, G. E. HAM "Ethylenimine and other Aziridines", Academic Press (1969), and in particular in US-A1-2003/0153726 (Eckhardt et al.).

According to one exemplary aspect of the disclosure, the polymerization initiator of the cationically self-polymerizable monomer for use herein is selected from the group consisting of protonating agents, alkylating agents, and any combinations or mixtures thereof.

In one advantageous aspect of the disclosure, the polymerization initiator of the cationically self-polymerizable monomer is selected from the group consisting of alkylating agents, in particular from the group consisting of arylsulphonic acid esters, sulfonium salts, in particular alkyl sulfonium salts, and any combinations or mixtures thereof.

More advantageously, the polymerization initiator of the cationically self-polymerizable monomer for use herein is selected from the group of arylsulphonic acid esters, in particular from the group consisting of p-toluene sulphonic acid esters, and preferably methyl-p-toluene sulfonate.

In an alternatively advantageous aspect of the disclosure, the polymerization initiator of the cationically self-polymerizable monomer is selected from the group consisting of protonating agents, in particular from the group consisting of Lewis acids, Broensted acids or precursor of Broensted acids, and any combinations or mixtures thereof.

In another advantageous aspect, the polymerization initiator of the cationically self-polymerizable monomer for use in the present disclosure is selected from the group consisting of Broensted acids, in particular from the group consisting of sulfonic acids, sulfonium acids, phosphonic acids, phosphoric acids, carboxylic acids, antimonic acids, boric acids, and any combinations, mixtures or salts thereof.

In still another advantageous aspect, the polymerization initiator of the cationically self-polymerizable monomer for use in the present disclosure is selected from the group consisting of Broensted acids, in combination with antacid-acting components, in particular selected from the group consisting of oxides, hydroxides, carbonates and carboxylates of the elements aluminium, chromium, copper, germanium, manganese, lead, antimony, tin, tellurium, titanium and zinc. The antacid-acting component may beneficially be selected to comprise zinc, and wherein the polymerization initiator of the cationically self-polymerizable monomer is in particular selected to be zinc tosylate.

Curing initiators of the curable monomer for use herein are not particularly limited, as long as they are different from the polymerization initiators of the cationically self-polymerizable monomers. Any curing initiators of curable monomers commonly known in the art of structural adhesives may be used in the context of the present disclosure. Suitable curing initiators for use herein may be easily identified by those skilled in the art in the light of the present disclosure.

According to one typical aspect of the disclosure, the curing initiator for use herein is selected from the group consisting of rapid-reacting curing initiators, latent curing initiators, and any combinations or mixtures thereof. More typically, the curing initiator for use herein is selected from the group consisting of rapid-reacting thermally-initiated curing initiators, latent thermally-initiated curing initiators, and any combinations or mixtures thereof.

According to an advantageous aspect of the present disclosure, the curing initiator of the curable monomer is selected from the group consisting of primary amines, secondary amines, and any combinations or mixtures thereof.

According to another advantageous aspect, the amines for use as curing initiator of the curable monomer are selected from the group consisting of aliphatic amines, cycloaliphatic amines, aromatic amines, aromatic structures having one or more amino moiety, polyamines, polyamine adducts, dicyandiamides, and any combinations or mixtures thereof.

According to still another advantageous aspect of the disclosure, the curing initiator of the curable monomer for use herein is selected from the group consisting of dicyandiamide, polyamines, polyamine adducts, and any combinations or mixtures thereof.

In a preferred aspect, the curing initiator of the curable monomer is selected to be dicyandiamide.

In an advantageous execution, the curable precursor of the present disclosure further comprises a curing accelerator of the curable monomer, which is in particular selected from the group consisting of polyamines, polyamine adducts, ureas, substituted urea adducts, imidazoles, imidazole salts, imidazolines, aromatic tertiary amines, and any combinations or mixtures thereof.

Curing initiators and curing accelerators are well known to those skilled in the art of structural adhesive compositions. Suitable curing initiators and curing accelerators for use herein and their methods of manufacturing are amply described e.g. in EP-A1-2 700 683 (Elgimiabi et al.) and in WO 2017/197087 (Aizawa).

In one preferred execution, the curing accelerator of the curable monomer is selected from the group of polyamine adducts, substituted ureas, in particular N-substituted urea adducts.

In a particularly preferred execution of the disclosure, the curing accelerator of the curable monomer is selected from the group of substituted urea adducts, in particular N-substituted urea adducts. In the context of the present disclosure, it has been indeed surprisingly discovered that the use of a curing accelerator of the curable monomer selected from the group of substituted urea adducts, in particular N-substituted urea adducts, substantially improve the adhesion properties, in particular the peel adhesion properties of the resulting structural adhesive composition.

According to a typical aspect of the present disclosure, the curable precursor further comprises a second curable monomer which is also different from the cationically self-polymerizable monomer.

In an advantageous aspect, the second curable monomer for use in the present disclosure comprises at least one functional group selected from the group consisting of epoxy groups, in particular glycidyl groups. Advantageously still, the second curable monomer for use herein is an epoxy resin, in particular selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

In a particularly preferred execution of the disclosure, the second curable monomer for use herein is an epoxy resin selected from the group consisting of hydrogenated bisphenol epoxy resins, in particular those derived from the reaction of hydrogenated bisphenol-A with epichlorhydrin (hydrogenated DGEBA resins), and any mixtures thereof. In the context of the present disclosure, it has been indeed surprisingly discovered that the use of a second curable monomer selected in particular from the group of hydrogenated bisphenol epoxy resins, substantially maintains or even improve the adhesion properties, in particular the peel adhesion properties of the resulting structural adhesive composition towards oily contaminated substrates. These specific curable precursors are particularly suitable to result into structural adhesive compositions having outstanding excellent oil-contamination tolerance towards, in particular oily contaminated metal substrates.

Exemplary oily contamination is for example mineral oils, and synthetic oils. Typical mineral oils include paraffinic mineral oils, intermediate mineral oils and naphthenic mineral oils.

In an advantageous aspect, the adhering step(s) of the surfaces to be bonded may be performed without using a pre-cleaning step of the substrates, parts and, and/or without using an adhesion promoter, in particular a priming composition or a tie layer.

According to another advantageous aspect, the curable precursor according to the disclosure further comprises a thermoplastic resin. Thermoplastic resins for use herein are not particularly limited. Any thermoplastic resins commonly known in the art of structural adhesives may be used in the context of the present disclosure. Suitable thermoplastic resins for use herein may be easily identified by those skilled in the art in the light of the present disclosure.

Thermoplastic resins are known to those skilled in the art of structural adhesive compositions. Suitable exemplary thermoplastic resins for use herein are described e.g. in EP-A1-2 700 683 (Elgimiabi et al.).

According to one advantageous aspect of the disclosure, the thermoplastic resins for use herein have a glass transition temperature (Tg) in a range from 60° C. and 140° C., when measured by Differential Scanning calorimetry (DSC).

In a more advantageous aspect, the thermoplastic resins for use herein have a softening point comprised between 70° C. and 120° C., preferably between 80° C. and 100° C., more preferably between 85° C. and 95° C.

According to another advantageous aspect of the disclosure, the thermoplastic resin for use herein is selected from the group consisting of polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonate thermoplastic resins, polyamide thermoplastic resins, polyurethane thermoplastic resins, and any combinations of mixtures thereof.

According to still another advantageous aspect of the disclosure, the thermoplastic resin for use herein is selected from the group of polyether thermoplastic resins, and in particular polyhydroxyether thermoplastic resins.

In a more advantageous aspect, the polyhydroxyether thermoplastic resins for use herein are selected from the group consisting of phenoxy resins, polyether diamine resins, polyvinylacetal resins, in particular polyvinyl butyral resins, and any combinations or mixtures thereof.

According to a particularly preferred execution of the disclosure, the thermoplastic resin for use herein is selected from the group of phenoxy resins.

In the context of the present disclosure, it has been indeed surprisingly discovered that the use of a thermoplastic resin, in particular a thermoplastic resin selected from the group of phenoxy resins, substantially improve the adhesion properties, in particular the peel adhesion properties, as well as the toughening characteristics of the resulting structural adhesive composition. This is particularly surprising and counterintuitive as thermoplastic resins are generally recognized and used as film-forming additives.

According to an advantageous aspect of the disclosure, the curable precursor is substantially free of acrylic-based monomers or acrylic resins. By "substantially free of acrylic-based monomers or acrylic resins", it is herewith meant to express that the curable precursor comprises less than 10 wt %, less than 5 wt %, less than 2 wt %, less than 1 wt %, or even less than 0.5 wt % of acrylic-based monomers or acrylic resins.

According to another advantageous aspect, the curable precursor of the disclosure is substantially free of free radical-polymerizable monomers or compounds, in particular irradiation-initiated free radical initiators. By "substantially free of free radical-polymerizable monomers or compounds", it is herewith meant to express that the curable precursor comprises less than 10 wt %, less than 5 wt %, less than 2 wt %, less than 1 wt %, or even less than 0.5 wt % of free radical-polymerizable monomers or compounds.

In one exemplary aspect, the curable precursor according to the present disclosure comprises:
  a) from 0.1 to 20 wt %, from 0.5 to 15 wt %, from 0.5 to 10 wt %, or even from 1 to 5 wt % of a cationically self-polymerizable monomer;
  b) from 10 to 80 wt %, from 20 to 70 wt %, or even from 20 to 60 wt %, of a curable monomer;
  c) from 0.01 to 10 wt %, from 0.02 to 8 wt %, from 0.05 to 5 wt %, from 0.1 to 3 wt %, or even from 0.2 to 2 wt %, of a polymerization initiator of the cationically self-polymerizable monomer;
  d) from 0.1 to 20 wt %, from 0.2 to 15 wt %, from 0.2 to 10 wt %, from 0.5 to 8 wt %, or even from 1 to 6 wt %, of a curing initiator of the curable monomer;
  e) from 0 to 60 wt %, from 1 to 50 wt %, from 1 to 40 wt %, from 2 to 30 wt %, from 5 to 30 wt %, from 5 to 20 wt %, or even from 8 to 15 wt %, of a second curable monomer;
  f) from 0 to 20 wt %, from 0.2 to 15 wt %, from 0.2 to 10 wt %, from 0.5 to 8 wt %, or even from 1 to 5 wt %, of a thermoplastic resin; and
  g) from 0 to 20 wt %, from 0.05 to 15 wt %, from 0.1 to 10 wt %, from 0.5 to 8 wt %, or even from 0.5 to 5 wt %, of a curing accelerator of the curable monomer; and
  h) optionally, a toughening agent.

According to an advantageous aspect of the disclosure, the curable precursor comprises a cationically self-polymerizable monomer and a curable monomer in a weight ratio ranging from 0.5:99.5 to 50:50, from 1:99 to 40:60, from 1:99 to 30:70, from 2:98 to 30:70, from 2:98 to 20:80, from 2:98 to 15:85, from 2:98 to 10:90, from 3:97 to 8:92, or even from 3:97 to 6:94.

According to one typical aspect, the curable precursor of the present disclosure is in the form of a one-part structural adhesive composition.

According to another typical aspect, the curable precursor of the present disclosure is in the form of a two-part structural adhesive composition having a first part and a second part, wherein:
a) the first part comprises:
  i. the cationically self-polymerizable monomer; and
  ii. the curing initiator of the curable monomer;
b) the second part comprises:
  i. the curable monomer; and
  ii. the polymerization initiator of the cationically self-polymerizable monomer;
wherein the first part and the second part are kept separated prior to combining the two parts and forming the structural adhesive composition.

According to another aspect, the present disclosure is directed to a partially cured precursor of a structural adhesive composition, comprising:
a) a polymeric material comprising the self-polymerization reaction product of a polymerizable material comprising a cationically self-polymerizable monomer;
b) optionally, some residual polymerization initiator of the cationically self-polymerizable monomer which is initiated at a temperature T1;
c) a curable monomer which is different from the cationically self-polymerizable monomer; and
d) a curing initiator of the curable monomer which is initiated at a temperature T2 and which is different from the polymerization initiator of the cationically self-polymerizable monomer; and
wherein the curable monomers are substantially uncured.

In a typical aspect of the partially cured precursor of a structural adhesive, the curable monomers are substantially uncured and are, in particular, embedded into the polymeric material comprising the self-polymerization reaction product of a polymerizable material comprising a cationically self-polymerizable monomer. In a typical aspect, the curable monomers are still liquid monomers embedded into the polymeric material resulting from the self-polymerization of the cationically self-polymerizable monomers, wherein this polymeric material represents a fully-established three-dimensional network.

The partially cured precursor typically is a stable and self-supporting composition having a dimensional stability, which makes it possible for it to be pre-applied on a selected substrate, in particular a liner, until further processing. In particular, the pre-applied substrate may be suitably transferred to other production sites until final full curing is performed. Advantageously still, the partially cured precursor may be appropriately shaped to fulfil the specific requirements of any selected applications. The partially cured precursor is typically provided with excellent characteristics and performance as to elasticity, tackiness, cold-flow and surface wetting.

According to a typical aspect of the partially cured precursor according to the disclosure, the polymeric material comprising the self-polymerization reaction product of the polymerizable material comprising the cationically self-polymerizable monomer is substantially fully polymerized and has in particular a degree of polymerization of more than 90%, more than 95%, more than 98%, or even more than 99%. As the polymeric material comprising the self-polymerization reaction product of the cationically self-polymerizable monomer is substantially fully polymerized, this polymerization reaction has advantageously a fixed and irreversible end and will not trigger any shelf-life reducing reactions in the remaining of the curable precursor. This characteristic will beneficially impact the overall shelf-life of the curable precursor.

According to a particularly advantageous aspect of the partially cured precursor, the polymeric material comprises or consists of a polyetherimine, in particular a linear or branched polyethylenimine (PEI). The polyetherimine typically results from the self-polymerization of bis-aziridino compounds, in particular N-alkyl aziridino-functional polyether oligomers, acting as cationically self-polymerizable monomers.

In one typical aspect of the disclosure, the partially cured precursor has a shear storage modulus in a range from 1000 to 250.000 Pa, from 1000 to 200.000 Pa, from 2000 to 150.000 Pa, from 3000 to 150.000 Pa, from 3000 to 100.000 Pa, or even from 3000 to 80.000 Pa, when measured according to the test method described in the experimental section.

In one advantageous aspect, the partially cured precursor according to the disclosure has a glass transition temperature (Tg) no greater than 0° C., no greater than –5° C., no greater than –10° C., no greater than –15° C., or even no greater than –20° C., when measured by DSC.

In another advantageous aspect of the disclosure, the partially cured precursor has an elongation at break of at least 50%, at least 80%, at least 100%, at least 150%, or even at least 200%, when measured according to tensile test DIN EN ISO 527. This particular property makes the partially cured precursor and the resulting structural adhesive suitable for automated handling and application, in particular by high-speed robotic equipment. More particularly, the partially cured precursor and the resulting structural adhesive of the present disclosure enables efficient automation of the process of forming a metal joint between metal plates. Moreover, this elasticity is highly advantageous for bonding metal substrates, in particular when one of the metal substrates is being re-shaped or folded during a process step. This is the case, for example, in a so-called hem flange process in which one metal panel is folded around the edge portion of another metal panel. Typically, an adhesive is provided in the hem flange portion between the first and second metal plate. Oftentimes, a phenomenon called "spring-back" is encountered in that the folded metal panel section exhibits a certain tendency to at least partially move back in the direction of its originally shape, thereby opening the hem flange. As known for the skilled person, this could also lead to a certain disconnection between metal panel and adhesive in this section. While a deformation of the hem flange away from the desired shape is a cosmetic issue, the disconnection between metal panel and adhesive may give rise to corrosion issues in this section. However, due to the elasticity of the precured adhesive composition of the present disclosure, the metal plates are being firmly held together, thereby avoiding or at least alleviating the spring-back and the issues arising therefrom. In addition, an improved sealing of gaps between substrates is provided by the adhesive compositions according to the present disclosure.

According to another aspect, the present disclosure relates to a structural adhesive composition obtainable by substantially fully curing the curable precursor as described above, in particular at a temperature T2 or greater.

In a typical aspect, the structural adhesive composition comprises an interpenetrating network involving the polymeric material comprising the self-polymerization reaction product of the polymerizable material comprising the cationically self-polymerizable monomer and the polymeric product resulting from the curing of the curable monomer.

According to an advantageous aspect, the partially or fully cured structural adhesive composition of the present disclosure is shaped in the form of an elongated film. This is advantageous for the application of the partially cured adhesive composition according to the present disclosure to the substrates to be bonded. The adhesive film may be easily and precisely applied to the surfaces, even by automated or robotic equipment, greatly increasing the speed of the application. Moreover, a pre-defined shape of the partially cured structural adhesive composition may be easily produced in accordance with the requirements occurring during industrial manufacturing operations, e.g. in the automotive industries. This includes different shapes and thicknesses. In particular, while a simple elongated film or strip may be sufficient for many occasions, a film or strip having a particular profile adapted to the substrate to be bonded may be highly advantageous.

According to still another aspect of the present disclosure, it is provided a curing system suitable for a structural adhesive composition, wherein the curing system comprises:
 a) a polymerization initiator of a cationically self-polymerizable monomer which is initiated at a temperature T1; and
 b) a curing initiator of a curable monomer which is initiated at a temperature T2 and which is different from the polymerization initiator of the cationically self-polymerizable monomer.

In a typical aspect of the curing system, the temperature T2 is greater than T1, and the temperature T1 at which the polymerization initiator of the cationically self-polymerizable monomer is initiated is insufficient to cause initiation of the curing initiator of the curable monomer.

All the particular and preferred aspects relating to, in particular, the structural adhesive composition, the cationically self-polymerizable monomer, the polymerization initiator of the cationically self-polymerizable monomer, the curable monomer, the curing initiator of the curable monomer, the temperatures T1 and T2, and the partially cured precursor which were described hereinabove in the context of the curable precursor or the partially cured precursor, are fully applicable to the curing system for a structural adhesive composition.

In yet another aspect, the present disclosure relates to a composite article comprising a curable precursor as described above or a partially of fully cured structural adhesive composition as described above applied on at least part of the surface of the article.

Suitable surfaces and articles for use herein are not particularly limited. Any surfaces, articles, substrates and material commonly known to be suitable for use in combination with structural adhesive compositions may be used in the context of the present disclosure.

According to another aspect, the present disclosure is directed to a method of manufacturing a composite article comprising the step of using a curable precursor as described above or a partially cured precursor as described above.

According to yet another aspect, the present disclosure provides a method of manufacturing a (hybrid) structural adhesive composition, comprising the steps of:

a) providing a curable precursor as described above;
b) partially curing the curable precursor of step a) by initiating the polymerization initiator of the cationically self-polymerizable monomer, thereby forming a partially cured precursor comprising a polymeric material resulting from the self-polymerization reaction product of the cationically self-polymerizable monomer; and
c) substantially fully curing the partially cured precursor of step b) by initiating the curing initiator of the curable monomer, thereby obtaining a substantially fully cured (hybrid) structural adhesive composition.

In the context of the present disclosure, the expression "substantially fully curing the partially cured precursor" is meant to express that more than 90 wt %, more than 95 wt %, more than 98 wt %, or even more than 99 wt % of the curable monomers are polymerized/cured.

In yet another aspect of the present disclosure, it is a provided a method of bonding two parts comprising the step of using a curable precursor as described above or a partially cured precursor as described above.

According to a particular aspect of the disclosure, the method of bonding two parts comprises the steps of:
 a) applying a curable precursor according to any of claims 1 to 59 or a partially cured precursor according to any claims 60 to 65 to a surface of at least one of the two parts;
 b) joining the two parts so that the curable precursor or the partially cured precursor (hybrid) structural adhesive composition is positioned between the two parts; and
 c) optionally, partially curing the curable precursor according of step a) by initiating the polymerization initiator of the cationically self-polymerizable monomer, thereby forming a partially cured precursor comprising a polymeric material resulting from the self-polymerization reaction product of the cationically self-polymerizable monomer; and/or
 d) substantially fully curing the partially cured precursor of step a) or c) by initiating the curing initiator of the cationically curable monomer, thereby obtaining a substantially fully cured (hybrid) structural adhesive composition and bonding the two parts.

According to an advantageous aspect of the method of bonding two parts, wherein the two parts are metal parts.

According to another advantageous aspect, the method of bonding two parts is for hem flange bonding of metal parts, wherein:
 the partially cured precursor is shaped in the form of an elongated film;
 the partially cured precursor film has a first portion near a first end of said precursor film and a second portion near the second end opposite to the first end of said precursor film;
 the first metal part comprises a first metal panel having a first body portion and a first flange portion along a margin of said first body portion adjacent a first end of said first body portion;
 the second metal part comprises a second metal panel having a second body portion and a second flange portion along a margin of said second body portion adjacent a second end of said second body portion;
 wherein the method comprises the steps of:
 a) adhering the partially cured precursor film to said first metal panel or second metal panel, whereby following adhering and folding, a metal joint is obtained wherein the partially cured precursor film is folded such that:

i. the first portion of the partially cured precursor film is provided between the second flange of the second metal panel and the first body portion of the first metal panel, and ii. the second portion of the partially cured precursor film is provided between the first flange of the first metal panel and the second body portion of the second metal panel; and b) substantially fully curing the partially cured precursor by initiating the curing initiator of the cationically curable monomer, thereby obtaining a substantially fully cured (hybrid) structural adhesive composition and bonding the metal joint.

According to still another advantageous aspect of the method of bonding two parts, a side of a first edge portion of the first metal part is folded back and a hem flange structure is formed so as to sandwich the second metal part, and the curable precursor as described above or the partially cured precursor as described above is disposed so as to adhere at least the first edge portion of the first metal part and a first surface side of the second metal part to each other.

Methods of bonding two parts, in particular for hem flange bonding of metal parts, are well known to those skilled in the art of structural adhesive compositions. Suitable methods of bonding two parts for use herein are amply described e.g. in EP-A1-2 700 683 (Elgimiabi et al.) and in WO 2017/197087 (Aizawa).

In a particular aspect of the present disclosure, the substrates, parts and surfaces for use in these methods comprise a metal selected from the group consisting of aluminum, steel, iron, and any mixtures, combinations or alloys thereof. More advantageously, the substrates, parts and surfaces for use herein comprise a metal selected from the group consisting of aluminum, steel, stainless steel and any mixtures, combinations or alloys thereof. In a particularly advantageous execution of the present disclosure, the substrates, parts and surfaces for use herein comprise aluminum.

According to another aspect, the present disclosure relates to a metal part assembly obtainable by the method(s) as described above.

According to still another aspect, the present disclosure relates to the use of a curable precursor as described above or a partially cured precursor as described above, for industrial applications, in particular for construction and automotive applications, in particular for body-in-white bonding applications for the automotive industry.

According to yet another aspect, the present disclosure relates to the use of a curable precursor as described above or a partially cured precursor as described above, for bonding metal parts, in particular for hem flange bonding of metal parts in the automotive industry.

In yet another aspect, the present disclosure relates to the use of a curing system as described above for the manufacturing of a (hybrid) structural adhesive composition.

Item 1 is a curable precursor of a (hybrid) structural adhesive composition, comprising:
a) a cationically self-polymerizable monomer;
b) a polymerization initiator of the cationically self-polymerizable monomer which is initiated at a temperature T1;
c) a curable monomer which is different from the cationically self-polymerizable monomer; and
d) a curing initiator of the curable monomer which is initiated at a temperature T2 and which is different from the polymerization initiator of the cationically self-polymerizable monomer.

Item 2 is a curable precursor according to item 1, wherein the temperature T2 is greater than T1, and wherein the temperature T1 at which the polymerization initiator of the cationically self-polymerizable monomer is initiated is insufficient to cause initiation of the curing initiator of the curable monomer.

Item 3 is a curable precursor according to any of item 1 or 2, wherein the cationically self-polymerizable monomer and the curable monomer are unable to chemically react with each other, in particular by covalent bonding, even when subjected to polymerization or curing initiation.

Item 4 is a curable precursor according to any of the preceding items, wherein the cationically self-polymerizable monomer and the curable monomer are unable to chemically react with each other, when subjected to polymerization or curing initiation at a temperature of 23° C.

Item 5 is a curable precursor according to any of the preceding items, wherein the temperature T1 is no greater than 90° C., no greater than 80° C., no greater than 60° C., no greater than 50° C., no greater than 40° C., no greater than 30° C., no greater than 25° C., no greater than 20° C., or even no greater than 15° C.

Item 6 is a curable precursor according to any of the preceding items, wherein the temperature T1 is in a range from −10° C. to 85° C., from 0° C. to 80° C., from 5° C. to 60° C., from 5° C. to 50° C., from 10 to 40° C., or even from 15 to 35° C.

Item 7 is a curable precursor according to any of the preceding items, wherein the temperature T2 is greater than 90° C., greater than 100° C., greater than 120° C., greater than 140° C., greater than 150° C., greater than 160° C., greater than 180° C., or even greater than 200° C.

Item 8 is a curable precursor according to any of the preceding items, wherein the temperature T2 is in a range from 95° C. to 250° C., from 100° C. to 220° C., from 120° C. to 200° C., from 140° C. to 200° C., from 140° C. to 180° C., or even from 160° C. to 180° C.

Item 9 is a curable precursor according to any of the preceding items, wherein the cationically self-polymerizable monomer is further crosslinkable.

Item 10 is a curable precursor according to any of the preceding items, wherein the cationically self-polymerizable monomer polymerizes by cationic ring-opening polymerization.

Item 11 is a curable precursor according to any of the preceding items, wherein the cationically self-polymerizable monomer is an oligomer having, in particular a number average molecular weight no greater than 20.000 g/mol, no greater than 15.000 g/mol, no greater than 12.000 g/mol, no greater than 10.000 g/mol, or even no greater than 8.000 g/mol.

Item 12 is a curable precursor according to any of the preceding items, wherein the cationically self-polymerizable monomer is a polyfunctional compound comprising at least one cyclic amine, preferably two cyclic amines.

Item 13 is a curable precursor according to item 12, wherein the cyclic amine is selected from the group consisting of aziridines, azetidines, pyrrolidines, piperidines, and any combinations or mixtures thereof.

Item 14 is a curable precursor according to any of the preceding items, wherein the cationically self-polymerizable monomer is a polyfunctional compound comprising at least two aziridine functional groups.

Item 15 is a curable precursor according to any of the preceding items, wherein the cationically self-polymerizable monomer is a polyfunctional aziridine, in particular a bis-aziridino compound.

Item 16 is a curable precursor according to any of the preceding items, wherein the cationically self-polymerizable monomer is an aziridino-functional oligomer, in particular an aziridino-functional polar oligomer.

Item 17 is a curable precursor according to any of the preceding items, wherein the cationically self-polymerizable monomer is an aziridino-functional compound based on an oligomer backbone, in particular a polar oligomer backbone, comprising in particular a (linear) polyether, a (linear) polyester or a (linear) polythioether.

Item 18 is a curable precursor according to any of the preceding items, wherein the cationically self-polymerizable monomer is an aziridino-functional (linear) polyether oligomer, in particular an N-alkyl aziridino-functional (linear) polyether oligomer.

Item 19 is a curable precursor according to item 18, wherein the (linear) polyether oligomer backbone is obtained by copolymerization of tetrahydrofuran units, ethylene oxide units, and optionally propylene oxide units.

Item 20 is a curable precursor according to any of the preceding items, wherein the cationically self-polymerizable monomer has the following formula:

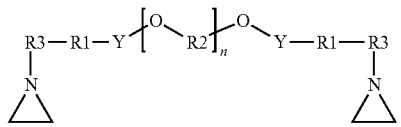

wherein:
R$^1$ is a covalent bond or an alkylene group;
each R$^2$ is independently selected from the group consisting of alkylene groups;
R$^3$ is a straight chain or branched alkylene groups;
Y is a divalent linking group;
and n is an integer selected such that the calculated number average molecular weight of the polyether oligomer is in particular greater than 2000 g/mol.

Item 21 is a curable precursor according to any of the preceding items, wherein the cationically self-polymerizable monomer has the following formula:

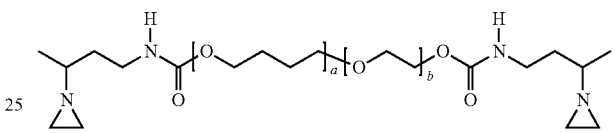

wherein:
R$^1$ is an alkylene group;
each R$^2$ is independently selected from the group consisting of alkylene groups having 2 to 6 carbon atoms; and
n is an integer selected such that the calculated number average molecular weight of the polyether oligomer is in particular between 2000 and 10.000 g/mol.

Item 22 is a curable precursor according to any of item 20 or 21, wherein the cationically self-polymerizable monomer has the following formula:

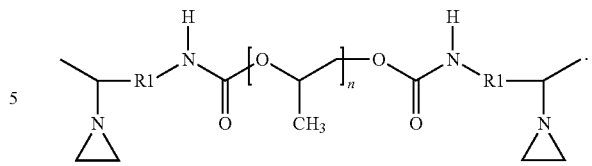

Item 23 is a curable precursor according to any of items 19 to 22, wherein R$^1$ is an alkylene group having two carbon atoms.

Item 24 is a curable precursor according to any of item 20 or 21, wherein R$^2$ is independently selected from the group consisting of linear alkylene groups having 2 to 6 carbon atoms.

Item 25 is a curable precursor according to item 20, wherein the cationically self-polymerizable monomer has the following formula:

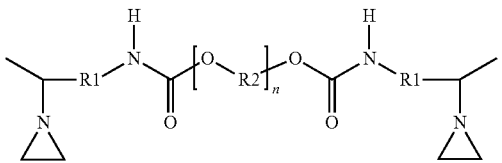

wherein a and b are integers greater than or equal to 1, and the sum of a and b is equal to n.

Item 26 is a curable precursor according to any of items 20 to 22, wherein n is selected such that the calculated number average molecular weight of the cationically self-polymerizable monomer is no greater than 10.000 grams/mole.

Item 27 is a curable precursor according to any of the preceding items, wherein the curable monomer which is different from the cationically self-polymerizable monomer is a cationically curable monomer, which is in particular curable by cationic ring-opening curing.

Item 28 is a curable precursor according to any of the preceding items, wherein the curable monomer which is different from the cationically self-polymerizable monomer comprises at least one functional group selected from the group consisting of epoxy groups, in particular glycidyl groups.

Item 29 is a curable precursor according to any of the preceding items, wherein the curable monomer is an epoxy resin, in particular selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

Item 30 is a curable precursor according to any of the preceding items, wherein the curable monomer is an epoxy resin selected from the group consisting of novalac epoxy resins, bisphenol epoxy resins, in particular those derived from the reaction of bisphenol-A with epichlorhydrin (DGEBA resins), and any mixtures thereof.

Item 31 is a curable precursor according to any of the preceding item, wherein the polymerization initiator of the cationically self-polymerizable monomer is selected from the group consisting of protonating agents, alkylating agents, and any combinations or mixtures thereof.

Item 32 is a curable precursor according to any of the preceding items, wherein the polymerization initiator of the cationically self-polymerizable monomer is selected from the group consisting of alkylating agents, in particular from the group consisting of arylsulphonic acid esters, sulfonium salts, in particular alkyl sulfonium salts, and any combinations or mixtures thereof.

Item 33 is a curable precursor according to any of item 31 or 32, wherein the polymerization initiator of the cationically self-polymerizable monomer is selected from the group of arylsulphonic acid esters, in particular from the group consisting of p-toluene sulphonic acid esters, and preferably methyl-p-toluene sulfonate.

Item 34 is a curable precursor according to any of items 1 to 31, wherein the polymerization initiator of the cationically self-polymerizable monomer is selected from the group consisting of protonating agents, in particular from the group consisting of Lewis acids, Broensted acids or precursor of Broensted acids, and any combinations or mixtures thereof.

Item 35 is a curable precursor according to any of items 1 to 31, wherein the polymerization initiator of the cationically self-polymerizable monomer is selected from the group consisting of Broensted acids, in particular from the group consisting of sulfonic acids, sulfonium acids, phosphonic acids, phosphoric acids, carboxylic acids, antimonic acids, boric acids, and any combinations, mixtures or salts thereof.

Item 36 is a curable precursor according to any of items 1 to 31 or 34, wherein polymerization initiator of the cationically self-polymerizable monomer is selected from the group consisting of Broensted acids, in combination with antacid-acting components, in particular selected from the group consisting of oxides, hydroxides, carbonates and carboxylates of the elements aluminium, chromium, copper, germanium, manganese, lead, antimony, tin, tellurium, titanium and zinc.

Item 37 is a curable precursor according to item 36, wherein the antacid-acting component is selected to comprise zinc, and wherein the polymerization initiator of the cationically self-polymerizable monomer is in particular selected to be zinc tosylate.

Item 38 is a curable precursor according to any of the preceding items, wherein the curing initiator of the curable monomer is selected from the group consisting of rapid-reacting (thermally-initiated) curing initiators, latent (thermally-initiated) curing initiators, and any combinations or mixtures thereof.

Item 39 is a curable precursor according to any of the preceding items, wherein the curing initiator of the curable monomer is selected from the group consisting of primary amines, secondary amines, and any combinations or mixtures thereof.

Item 40 is a curable precursor according to item 39, wherein the amines are selected from the group consisting of aliphatic amines, cycloaliphatic amines, aromatic amines, aromatic structures having one or more amino moiety, polyamines, polyamine adducts, dicyandiamides, and any combinations or mixtures thereof.

Item 41 is a curable precursor according to any of the preceding items, wherein the curing initiator of the curable monomer is selected from the group consisting of dicyandiamide, polyamines, polyamine adducts, and any combinations or mixtures thereof.

Item 42 is a curable precursor according to any of the preceding items, wherein the curing initiator of the curable monomer is selected to be dicyandiamide.

Item 43 is a curable precursor according to any of the preceding items, which further comprises a curing accelerator of the curable monomer, which is in particular selected from the group consisting of polyamines, polyamine adducts, ureas, substituted urea adducts, imidazoles, imidazole salts, imidazolines, aromatic tertiary amines, and any combinations or mixtures thereof.

Item 44 is a curable precursor according to item 43, wherein the curing accelerator of the curable monomer is selected from the group of polyamine adducts, substituted ureas, in particular N-substituted urea adducts.

Item 45 is a curable precursor according to any of the preceding items, which further comprises a second curable monomer which is different from the cationically self-polymerizable monomer.

Item 46 is a curable precursor according to item 45, wherein the second curable monomer comprises at least one functional group selected from the group consisting of epoxy groups, in particular glycidyl groups.

Item 47 is a curable precursor according to any of item 45 or 46, wherein the second curable monomer is an epoxy resin, in particular selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

Item 48 is a curable precursor according to any of item 45 to 47, wherein the second curable monomer is an epoxy resin selected from the group consisting of hydrogenated bisphenol epoxy resins, in particular those derived from the reaction of hydrogenated bisphenol-A with epichlorhydrin (hydrogenated DGEBA resins), and any mixtures thereof.

Item 49 is a curable precursor according to any of the preceding items, which further comprises a thermoplastic resin having in particular a glass transition temperature (Tg) in a range from 60° C. to 140° C., from 70° C. to 120° C., from 80° C. to 100° C., or even from 85° C. to 95° C., when measured by Differential Scanning calorimetry (DSC).

Item 50 is a curable precursor according to item 49, wherein the thermoplastic resin is selected from the group consisting of polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonate thermoplastic resins, polyamide thermoplastic resins, polyurethane thermoplastic resins, and any combinations of mixtures thereof.

Item 51 is a curable precursor according to any of item 49 or 50, wherein the thermoplastic resin is selected from the group of polyether thermoplastic resins, and in particular polyhydroxyether thermoplastic resins.

Item 52 is a curable precursor according to item 51, wherein the polyhydroxyether thermoplastic resins are selected from the group consisting of phenoxy resins, polyether diamine resins, polyvinylacetal resins, in particular polyvinyl butyral resins, and any combinations or mixtures thereof.

Item 53 is a curable precursor according to any of items 49 to 52, wherein the thermoplastic resin is selected from the group of phenoxy resins.

Item 54 is a curable precursor according to any of the preceding items, which is substantially free of acrylic-based monomers or acrylic resins.

Item 55 is a curable precursor according to any of the preceding items, which is substantially free of free radical-polymerizable monomers or compounds, in particular irradiation-initiated free radical initiators.

Item 56 is a curable precursor according to any of the preceding items, which comprises:

a) from 0.1 to 20 wt %, from 0.5 to 15 wt %, from 0.5 to 10 wt %, or even from 1 to 5 wt % of a cationically self-polymerizable monomer;
b) from 10 to 80 wt %, from 20 to 70 wt %, or even from 20 to 60 wt %, of a curable monomer;
c) from 0.01 to 10 wt %, from 0.02 to 8 wt %, from 0.05 to 5 wt %, from 0.1 to 3 wt %, or even from 0.2 to 2 wt %, of a polymerization initiator of the cationically self-polymerizable monomer;
d) from 0.1 to 20 wt %, from 0.2 to 15 wt %, from 0.2 to 10 wt %, from 0.5 to 8 wt %, or even from 1 to 6 wt %, of a curing initiator of the curable monomer;
e) from 0 to 60 wt %, from 1 to 50 wt %, from 1 to 40 wt %, from 2 to 30 wt %, from 5 to 30 wt %, from 5 to 20 wt %, or even from 8 to 15 wt %, of a second curable monomer;
f) from 0 to 20 wt %, from 0.2 to 15 wt %, from 0.2 to 10 wt %, from 0.5 to 8 wt %, or even from 1 to 5 wt %, of a thermoplastic resin; and
g) from 0 to 20 wt %, from 0.05 to 15 wt %, from 0.1 to 10 wt %, from 0.5 to 8 wt %, or even from 0.5 to 5 wt %, of a curing accelerator of the curable monomer; and
h) optionally, a toughening agent.

Item 57 is a curable precursor according to any of the preceding items, which comprises a cationically self-polymerizable monomer and a curable monomer in a weight ratio ranging from 0.5:99.5 to 50:50, from 1:99 to 40:60, from 1:99 to 30:70, from 2:98 to 30:70, from 2:98 to 20:80, from 2:98 to 15:85, from 2:98 to 10:90, from 3:97 to 8:92, or even from 3:97 to 6:94.

Item 58 is a curable precursor according to any of the preceding items, which is in the form of a one-part (hybrid) structural adhesive composition.

Item 59 is a curable precursor according to any of items 1 to 58, which is in the form of a two-part (hybrid) structural adhesive composition having a first part and a second part, wherein:
a) the first part comprises:
  i. the cationically self-polymerizable monomer; and
  ii. the curing initiator of the curable monomer;
b) the second part comprises:
  i. the curable monomer; and
  ii. the polymerization initiator of the cationically self-polymerizable monomer;
wherein the first part and the second part are kept separated prior to combining the two parts and forming the (hybrid) structural adhesive composition.

Item 60 is a partially cured precursor of a (hybrid) structural adhesive composition, comprising:
a) a polymeric material comprising the self-polymerization reaction product of a polymerizable material comprising a cationically self-polymerizable monomer;
b) optionally, some residual polymerization initiator of the cationically self-polymerizable monomer which is initiated at a temperature T1;
c) a curable monomer which is different from the cationically self-polymerizable monomer; and
d) a curing initiator of the curable monomer which is initiated at a temperature T2 and which is different from the polymerization initiator of the cationically self-polymerizable monomer; and
wherein the curable monomers are substantially uncured and are in particular embedded into the polymeric material comprising the self-polymerization reaction product of a polymerizable material comprising a cationically self-polymerizable monomer.

Item 61 is a partially cured precursor according to item 60, wherein the polymeric material comprising the self-polymerization reaction product of the polymerizable material comprising the cationically self-polymerizable monomer is substantially fully polymerized and has in particular a degree of polymerization of more than 90%, more than 95%, more than 98%, or even more than 99%.

Item 62 is a partially cured precursor according to any of item 60 or 61, wherein the polymeric material comprises or consists of a polyetherimine, in particular a linear or branched polyethylenimine (PEI).

Item 63 is a partially cured precursor according to any of items 60 to 62, which has a shear storage modulus in a range from 1000 to 250.000 Pa, from 1000 to 200.000 Pa, from 2000 to 150.000 Pa, from 3000 to 150.000 Pa, from 3000 to 100.000 Pa, or even from 3000 to 80.000 Pa, when measured according to the test method described in the experimental section.

Item 64 is a partially cured precursor according to any of items 60 to 63, which has a glass transition temperature (Tg) no greater than 0° C., no greater than −5° C., no greater than −10° C., no greater than −15° C., or even no greater than −20° C., when measured by DSC.

Item 65 is a partially cured precursor according to any of items 60 to 64, which has an elongation at break of at least 50%, at least 80%, at least 100%, at least 150%, or even at least 200%, when measured according to tensile test DIN EN ISO 527.

Item 66 is a (hybrid) structural adhesive composition obtainable by substantially fully curing the curable precursor according to any of the preceding items, in particular at a temperature T2 or greater.

Item 67 is a (hybrid) structural adhesive composition according to item 66, which comprises an interpenetrating network involving the polymeric material comprising the self-polymerization reaction product of the polymerizable material comprising the cationically self-polymerizable monomer and the polymeric product resulting from the curing of the curable monomer.

Item 68 is a partially or fully cured (hybrid) structural adhesive composition according to any of items 60 to 67 which is shaped in the form of an elongated film.

Item 69 is a curing system suitable for a (hybrid) structural adhesive composition, wherein the curing system comprises:
a) a polymerization initiator of a cationically self-polymerizable monomer which is initiated at a temperature T1; and
b) a curing initiator of a curable monomer which is initiated at a temperature T2 and which is different from the polymerization initiator of the cationically self-polymerizable monomer.

Item 70 is a curing system according to item 69, wherein the temperature T2 is greater than T1, and wherein the temperature T1 at which the polymerization initiator of the cationically self-polymerizable monomer is initiated is insufficient to cause initiation of the curing initiator of the curable monomer.

Item 71 is a composite article comprising a curable precursor according to any of items 1 to 59 or a partially of fully cured (hybrid) structural adhesive composition according to item 68 applied on at least part of the surface of the article.

Item 72 is a method of manufacturing a composite article comprising the step of using a curable precursor according to any of items 1 to 59 or a partially cured precursor according to any of items 60 to 65.

Item 73 is a method of manufacturing a (hybrid) structural adhesive composition, comprising the steps of:
a) providing a curable precursor according to any of items 1 to 59;
b) partially curing the curable precursor of step a) by initiating the polymerization initiator of the cationically self-polymerizable monomer, thereby forming a partially cured precursor comprising a polymeric material resulting from the self-polymerization reaction product of the cationically self-polymerizable monomer; and
c) substantially fully curing the partially cured precursor of step b) by initiating the curing initiator of the curable monomer, thereby obtaining a substantially fully cured (hybrid) structural adhesive composition.

Item 74 is a method of bonding two parts comprising the step of using a curable precursor according to any of items 1 to 59 or a partially cured precursor according to any of items 60 to 65.

Item 75 is a method of bonding two parts according to item 74, which comprises the steps of:
a) applying a curable precursor according to any of items 1 to 59 or a partially cured precursor according to any of items 60 to 65 to a surface of at least one of the two parts;
b) joining the two parts so that the curable precursor or the partially cured precursor (hybrid) structural adhesive composition is positioned between the two parts; and
c) optionally, partially curing the curable precursor according of step a) by initiating the polymerization initiator of the cationically self-polymerizable monomer, thereby forming a partially cured precursor comprising a polymeric material resulting from the self-polymerization reaction product of the cationically self-polymerizable monomer; and/or
d) substantially fully curing the partially cured precursor of step a) or c) by initiating the curing initiator of the cationically curable monomer, thereby obtaining a substantially fully cured (hybrid) structural adhesive composition and bonding the two parts.

Item 76 is a method of bonding two parts according to any of item 74 or 75, wherein the two parts are metal parts, and wherein the method is for hem flange bonding of metal parts.

Item 77 is a method according to item 76, wherein:
the partially cured precursor is shaped in the form of an elongated film;
the partially cured precursor film has a first portion near a first end of said precursor film and a second portion near the second end opposite to the first end of said precursor film;
the first metal part comprises a first metal panel having a first body portion and a first flange portion along a margin of said first body portion adjacent a first end of said first body portion;
the second metal part comprises a second metal panel having a second body portion and a second flange portion along a margin of said second body portion adjacent a second end of said second body portion;
wherein the method comprises the steps of:
1. adhering the partially cured precursor film to said first metal panel or second metal panel, whereby following adhering and folding, a metal joint is obtained wherein the partially cured precursor film is folded such that:
iii. the first portion of the partially cured precursor film is provided between the second flange of the second metal panel and the first body portion of the first metal panel, and
iv. the second portion of the partially cured precursor film is provided between the first flange of the first metal panel and the second body portion of the second metal panel; and
2. substantially fully curing the partially cured precursor by initiating the curing initiator of the cationically curable monomer, thereby obtaining a substantially fully cured (hybrid) structural adhesive composition and bonding the metal joint.

Item 78 is a method according to item 76, wherein a side of a first edge portion of the first metal part is folded back and a hem flange structure is formed so as to sandwich the second metal part, and the curable precursor according to any of items 1 to 57 or the partially cured precursor according to any of items 58 to 62 is disposed so as to adhere at least the first edge portion of the first metal part and a first surface side of the second metal part to each other.

Item 79 is a metal part assembly obtainable by the method according to any of items 76 to 78.

Item 80 is the use of a curable precursor according to any of items 1 to 59 or a partially cured precursor according to any of items 60 to 65, for industrial applications, in particular for construction and automotive applications, in particular for body-in-white bonding applications for the automotive industry.

Item 81 is the use according to item 80 for bonding metal parts, in particular for hem flange bonding of metal parts in the automotive industry.

Item 82 is the use of a curing system according to any of item 69 or 70 for the manufacturing of a (hybrid) structural adhesive composition.

EXAMPLES

The present disclosure is further illustrated by the following examples. These examples are merely for illustrative purposes only and are not meant to be limiting on the scope of the appended claims.

Test Methods:
Preparation of the Formulations for Testing:
The curable precursor compositions are prepared from an extruded mixture of two components (Part B and Part A). The preparation of both, part A and B, is described hereinafter. Parts A and Part B are weighed into a beaker in the appropriate mixing ratio and mixed at 3500 rpm for 0.5 minutes until a homogeneous mixture is achieved. As soon as this step is completed the mixing initiates the first reaction step (stage-B reaction step) resulting in a partially cured precursor within a period ranging from 30 to 60 minutes. Within the open time, the obtained paste is applied to the surface of the test panel for further testing in the manner specified below.

Preparation of the Test Samples for OLS and T-Peel Tests:
The surface of OLS and T-peel samples (steel, grade DX54+ZMB-RL1615) are cleaned with n-heptane and in case of oily contaminated samples, coated with 3 g/m² of the testing oil (PL 3802-39S commercially available from Fuchs Petrolub AG, Germany). The test samples are left at ambient room temperature (23° C.+/−2° C., 50% relative humidity+1-5%) for 24 hours prior to testing and the OLS and T-peel strengths are measured as described above.

1) Overlap Shear Strength (OLS) According to DIN EN 1465.
Overlap shear strength is determined according to DIN EN 1465 using a Zwick Z050 tensile tester (commercially available by Zwick GmbH & Co. KG, Ulm, Germany) operating at a cross head speed of 10 mm/min. For the preparation of an Overlap Shear Strength test assembly, the paste resulting from the mixing of Part A and Part B is spackled onto one surface of a test panel and removed with a squeegee to give a defined layer having a thickness of 300 □m. The sample is then stored at room temperature for 12 hours to ensure full transformation into a precured precursor. Afterwards, the sample is covered by a second steel strip forming an overlap joint of 13 mm. The overlap joints are then clamped together using two binder clips and the test assemblies are further stored at room temperature for 4 hours after bonding, and then placed into an air circulating oven for 30 minutes at 180° C. The next day, the samples are either tested directly or undergo ageing and are tested thereafter. Five samples are measured for each of the examples and results averaged and reported in MPa.

2) T-Peel Strength According to DIN EN ISO 11339.

T-Peel strength is determined according to DIN EN ISO 11339 using a Zwick Z050 tensile tester (commercially available by Zwick GmbH & Co. KG, Ulm, Germany) operating at a cross head speed of 100 mm/min. For the preparation of a T-Peel Strength test assembly, the paste resulting from the mixing of Part A and Part B is placed in a syringe without needle cap and directly applied to the first surface via extruding a bead onto the middle of the T-peel test panel. The second test panel surface is then immediately bonded to the first forming an overlap joint of 100 mm, without waiting for the transformation into a precured precursor state. The inclusion of glass beads into the formulation ensures that the right thickness of the layer (0.3 mm) is reached by pressing the surfaces together. After removal of squeezed-out adhesive, the samples are fixed together with clamps and first stored at room temperature for 12 hours, and then placed into an air circulating oven for 30 minutes at 180° C. The next day, the samples are either tested directly or undergo ageing and are tested thereafter. Three samples are measured for each of the examples and results averaged and reported in Newtons (N).

OLS Strength Test after Ageing:

The samples are prepared as described previously in the OLS general test procedure, at the exception that the test samples are—prior to testing—previously submitted to:
 a) a 10-day hot/wet (H/W) ageing procedure according to EN ISO 6270-2:2018; and
 b) optionally, to a hot/wet (H/W) corrosion ageing procedure according to PV 1210-2:2010 (Volkswagen Group).

After appropriate ageing, the test samples are reconditioned in a constant climate room for 24 hours and the performance is measured as described above.

3) Failure Mode

An overlap shear strength test as described above was carried out, except that the material of the test panels was different. The samples were visually inspected by the naked eye after failure of the adhesive bond and evaluated as follows: if the failure was completely within the adhesive layer, the failure mode was considered as "cohesive failure". However, if a failure was observed in that at least part of the adhesive layer had separated from the metal substrate, the failure mode was considered "adhesive failure". Per example material, 3 adhesive peel strength test assemblies are prepared and the test results averaged. From an application point of view, the "cohesive failure mode" is highly desirable and therefore strongly preferred.

Raw Materials:

In the examples, the following raw materials and commercial adhesive tapes used are used:

Bisaziridino polyether (BAPE) is a cationically self-polymerizable bisaziridino-functional oligomer having a number average molecular weight of about 6200 g/mol, which is obtained by copolymerization of ethylene oxide and tetrahydrofuran (in a ratio of about 1:4) as described in DE 1 544 837 (Schmitt et al.).

Methyl-p-toluenesulfonate (MPTS) is a polymerization initiator of the cationically self-polymerizable monomer, commercially available from Sigma-Aldrich.

DEN 431 is an epoxy resin, commercially available from DOW Chemical Pacific, The Heeren, Singapore.

Epikote 828 is an epoxy resin, commercially available from Hexion Specialty Chemicals GmbH, Iserlohn, Germany.

Eponex 1510 is a hydrogenated bisphenol epoxy resin, commercially available from Hexion Specialty Chemicals GmbH, Iserlohn, Germany.

Amicure CG1200 is a dicyandiamide-based latent curing initiator for epoxies, commercially from available from Evonik, Allentown, PA, USA.

Ancamine 2014 FG is a polyamine-based curing accelerator for epoxies, commercially available Evonik, Allentown, PA, USA.

Dyhard UR500 is a curing accelerator for epoxies, commercially available from AlzChem Trostberg, Germany.

PK-HA is a phenoxy resin, commercially available from Gabriel Phenoxies Inc., Rock Hill, SC, USA.

KaneAce MX 257 is a toughening agent, commercially available from Kaneka Belgium N.V., Westerlo, Belgium.

KaneAce MX 153 is a toughening agent, commercially available from Kaneka Belgium N.V., Westerlo, Belgium.

Sil Cell 32 is an aluminum silicate filler, commercially available from Stauss Perlite GmbH, Austria.

Shieldex AC-5 is a silica based anti-corrosive agent, commercially available from Grace GmbH, Germany.

MinSil SF20 is a fused silica filler, obtained from the 3M Company, USA.

Dynasylan GLYEO is a silane-based adhesion promoter agent, commercially available from Evonik GmbH, Germany.

Glass Beads Class IV, obtained from the 3M Company, USA.

EXAMPLES

Preparation of Examples 1-3 and Comparative Example C1

The exemplary 2-component (Part A and Part B) curable compositions according to the present disclosure are prepared by combining the ingredients from the list of materials of Table 1 in a high-speed mixer (DAC 150 FVZ Speedmixer, available from Hauschild Engineering, Germany) stirring at 3500 rpm for 0.5 minutes until a homogeneous mixture is achieved. In Table 1, all concentrations are given as wt. %. Comparative example C1 does not comprise any cationically self-polymerizable monomer or any polymerization initiator thereof.

Part B is prepared as follows:

KaneAce MX 257, KanAce MX 153, Eponex 1510 ad DEN 431 are placed in a small beaker and mixed together using a planetary high-speed mixer (DAC150 FVZ) at 3500 rpm for 1 minute. Then, methyl-p-toluenesulfonate is added and mixed until a homogeneous mixture is obtained. Thereafter, Sil Cell 32, Shieldex AC-5 and MinSil SF20 are subsequently added and blended into the mixture by mixing at 3500 rpm for 1 minute. Then, Dynasylan GLYEO is added, followed by Glass Beads, resulting into Part B of the 2-component curable compositions.

Part A is prepared as follows:

Amicure CG1200 and Ancamine 2014 FG (or Dyhard UR500) are placed in a beaker. Subsequently, the bisaziridino polyether (BAPE) is added to the mixture which is then mixed using a planetary high-speed mixer (DAC150 FVZ) at 3500 rpm for 1 minute until a homogeneous mixture is achieved, resulting into Part A of 2-component curable compositions.

Part A and Part B are weighed into a beaker in the correct mixing ratio and mixed at 3500 rpm for 0.5 minutes until a homogeneous mixture is achieved.

TABLE 1

|  | Weight % | | | |
| --- | --- | --- | --- | --- |
| Raw material | Example 1 | Example 2 | Example 3 | Example C1 |
| BAPE | 4 | 4 | 4 | — |
| MPTS | 0.8 | 0.8 | 0.8 | — |
| DEN 431 | 9 | 8.1 | 8.1 | 8.6 |
| Epikote 828 | — | — | 2.5 | — |
| Eponex 1510 | 10.8 | 10.8 | 10.8 | 11.5 |
| Amicure CG1200 | 3 | 3 | 3.1 | 3.5 |
| Ancamine 2014 FG | 1.5 | — | 1.5 | 1.8 |
| Dyhard UR500 | — | 1.7 | — | — |
| PK-HA | — | — | 2.5 | — |
| KaneAce MX 257 | 26 | 27 | 24.6 | 28.6 |
| KaneAce MX 153 | 26 | 27 | 24.6 | 28.6 |
| Sil Cell 32 | 1 | 1 | 0.9 | 0.9 |
| Shieldex AC-5 | 1.9 | 1.9 | 1.8 | 1.8 |
| MinSil SF20 | 14 | 12.7 | 12.8 | 12.7 |
| Dynasylan GLYEO | 1 | 1 | 1 | 1 |
| Glass Beads Class IV | 1 | 1 | 1 | 1 |

OLS and T-Peel Performance

TABLE 2

Results of the OLS and T-Peel Tests.

|  | Example 1 | Example 2 | Example 3 |
| --- | --- | --- | --- |
| OLS (MPa) | 13.3 | 12.6 | 13.3 |
| T-Peel (N) | 54.5 | 84.5 | 83.6 |

As can be seen from the results shown in Table 2, the structural adhesives according to the present disclosure provide excellent performance and characteristics as to overlap shear strength and T-Peel strength. The results obtained with the curable compositions of examples 2 and 3 show the improved T-peel adhesion performance obtained while using respectively a substituted urea-based curing accelerator for epoxies (Dyhard UR500) and a phenoxy resin (PK-HA).

OLS Strength Performance on Oily Contaminated Substrates

The OLS strength performance is also tested on steel samples contaminated with testing oil (3 g/m$^2$ of PL 3802-39S commercially available from Fuchs Petrolub AG, Germany).

TABLE 3

Results of the OLS Tests on oily contaminated substrates.

|  | Example 1 | Example C1 |
| --- | --- | --- |
| OLS on clean substrate (MPa) | 13.1 | 16.6 |
| OLS on oily contaminated substrates (MPa) | 13.3 | 16.4 |

As can be seen from the results shown in Table 3, the structural adhesives according to the present disclosure provide even improved OLS strength performance on oily contaminated substrates when compared to clean substrates. In contrast, comparative example 1 (not comprising any cationically self-polymerizable monomer or any polymerization initiator thereof) expectedly show a slight loss of OLS strength on oily contaminated substrates.

OLS Strength Performance Upon Ageing

The OLS strength performance is also tested on steel samples upon various ageing conditions.

TABLE 4

Results of the OLS Tests upon ageing.

|  | Example 1 | Example C1 |
| --- | --- | --- |
| OLS on clean substrate—initial (MPa) | 13.1 | 16.6 |
| OLS on clean substrates—10 days H/W ageing procedure (MPa) | 13.8 | 15.1 |
| OLS on oily contaminated substrates—initial (MPa) | 13.3 | 16.4 |
| OLS on oily contaminated substrates—10 days H/W ageing procedure (MPa) | 14.1 | 14.7 |
| OLS on oily contaminated substrates—PV1210 ageing procedure/30 cycles (MPa) | 14.1 | — |

As can be seen from the results shown in Table 4, the structural adhesives according to the present disclosure provide even improved OLS strength performance upon various ageing conditions. In contrast, comparative example 1 (not comprising any cationically self-polymerizable monomer or any polymerization initiator thereof) expectedly show substantial loss of OLS strength upon ageing, especially on oily contaminated substrates.

Failure Mode:

The failure mode was tested for a number of combinations of metal/metal and metal/CFK panels, using the adhesive according to example 1. The results are summarized in Table 5.

TABLE 5

Failure mode test results.

| First panel material/second panel material | Failure mode |
| --- | --- |
| aluminium/aluminium | cohesive |
| aluminium/CFK | cohesive |
| aluminium/steel | cohesive |
| steel/CFK | cohesive |

The invention claimed is:

1. A curable precursor of a structural adhesive composition, comprising:
   a cationically self-polymerizable monomer which comprises at least one cyclic amine;
   a polymerization initiator of the cationically self-polymerizable monomer which is initiated at a temperature T1;
   a curable monomer which is different from the cationically self-polymerizable monomer which comprises at least one epoxy group; and
   a curing initiator of the curable monomer which is initiated at a temperature T2 and which is different from the polymerization initiator of the cationically self-polymerizable monomer.

2. A curable precursor according to claim 1, wherein the temperature T2 is greater than T1, and wherein the temperature T1 at which the polymerization initiator of the cationically self-polymerizable monomer is initiated is insufficient to cause initiation of the curing initiator of the curable monomer.

3. A curable precursor according to any of claim 1, wherein the temperature T1 is no greater than 90° C.

4. A curable precursor according to claim 1, wherein the temperature T2 is greater than 90° C.

5. A curable precursor according to claim 1, wherein the cationically self-polymerizable monomer is an oligomer having, in particular a number average molecular weight no greater than 20,000 g/mol.

6. A curable precursor according to claim 1, wherein the cationically self-polymerizable monomer is a polyfunctional compound comprising at least one two cyclic amines.

7. A curable precursor according to claim 1, wherein the cationically self-polymerizable monomer comprising at least one cyclic amine is an aziridino-functional polyether oligomer.

8. A curable precursor according to claim 1, wherein the curable monomer which is different from the cationically self-polymerizable monomer comprises at least one glycidyl group.

9. A curable precursor according to claim 1, wherein the polymerization initiator of the cationically self-polymerizable monomer is selected from the group consisting of protonating agents, alkylating agents, and any combinations or mixtures thereof.

10. A curable precursor according to claim 1, wherein the curing initiator of the curable monomer is selected from the group consisting of primary amines, secondary amines, and any combinations or mixtures thereof.

11. A curable precursor according to claim 1, which further comprises a curing accelerator of the curable monomer which is selected from the group consisting of polyamines, polyamine adducts, ureas, substituted urea adducts, imidazoles, imidazole salts, imidazolines, aromatic tertiary amines, and any combinations or mixtures thereof.

12. A curable precursor according to claim 1, which further comprises a thermoplastic resin having in particular a glass transition temperature (Tg) in a range from 60° C. to 140° C., when measured by Differential Scanning Calorimetry (DSC).

13. A method of bonding two parts, which comprises the steps of:
   applying the curable precursor according to claim 1 to a surface of at least one of the two parts;
   joining the two parts so that the curable precursor or the partially cured precursor structural adhesive composition is positioned between the two parts; and
   optionally, partially curing the curable precursor according of step a) by initiating the polymerization initiator of the cationically self-polymerizable monomer, thereby forming a partially cured precursor comprising a polymeric material resulting from the self-polymerization reaction product of the cationically self-polymerizable monomer; and/or
   substantially fully curing the partially cured precursor of step a) or c) by initiating the curing initiator of the cationically curable monomer, thereby obtaining a substantially fully cured structural adhesive composition and bonding the two parts.

14. A partially cured precursor of a structural adhesive composition, comprising:
   a polymeric material comprising the self-polymerization reaction product of a polymerizable material comprising a cationically self-polymerizable monomer which comprises at least one cyclic amine
   optionally, some residual polymerization initiator of the cationically self-polymerizable monomer which is initiated at a temperature T1;
   a curable monomer which is different from the cationically self-polymerizable monomer which comprises at least one epoxy group; and
   a curing initiator of the curable monomer which is initiated at a temperature T2 and which is different from the polymerization initiator of the cationically self-polymerizable monomer; and
   wherein the curable monomers are substantially uncured and are in particular embedded into the polymeric material comprising the self-polymerization reaction product of a polymerizable material comprising a cationically self-polymerizable monomer.

15. A method of bonding two parts, which comprises the steps of:
   applying the partially cured precursor according to claim 14 to a surface of at least one of the two parts;
   joining the two parts so that the curable precursor or the partially cured precursor structural adhesive composition is positioned between the two parts; and
   optionally, partially curing the curable precursor according of step a) by initiating the polymerization initiator of the cationically self-polymerizable monomer, thereby forming a partially cured precursor comprising a polymeric material resulting from the self-polymerization reaction product of the cationically self-polymerizable monomer; and/or
   substantially fully curing the partially cured precursor of step a) or c) by initiating the curing initiator of the cationically curable monomer, thereby obtaining a substantially fully cured structural adhesive composition and bonding the two parts.

* * * * *